Oct. 29, 1935.  J. WERTZHEISER ET AL  2,018,939
ARMORED ELECTRICAL CABLE
Filed May 15, 1935
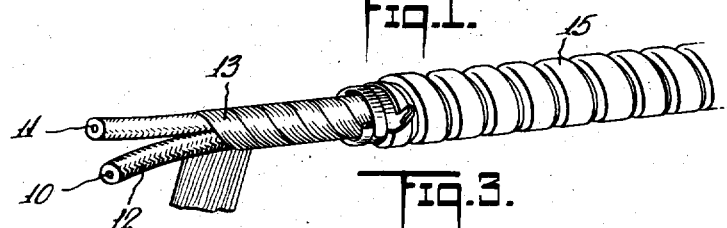
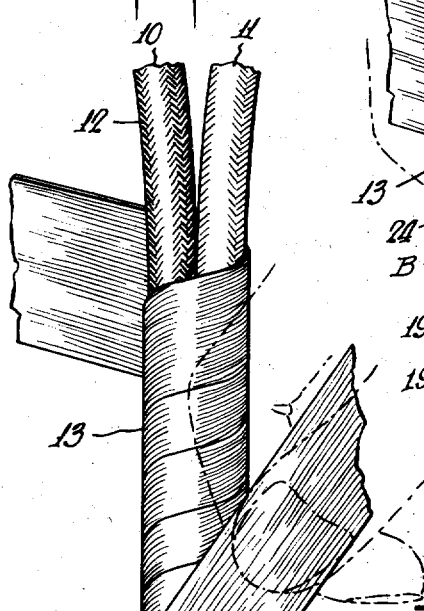
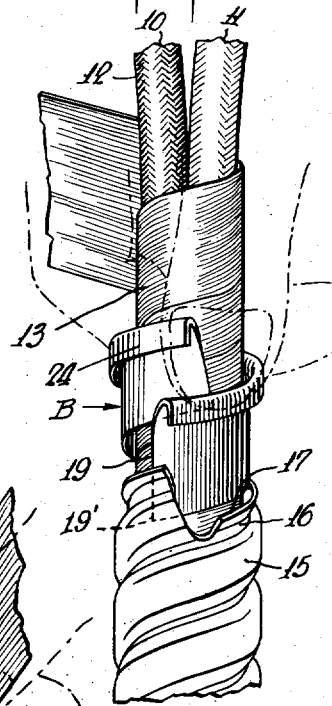
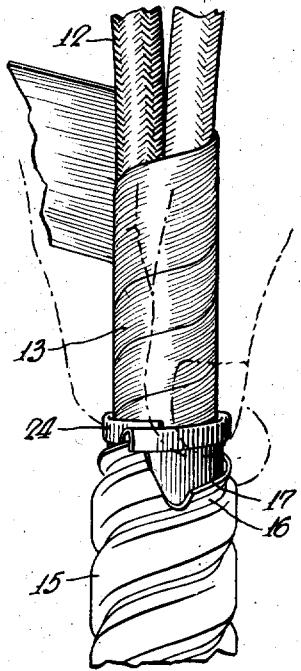
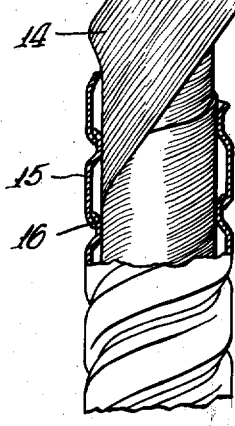
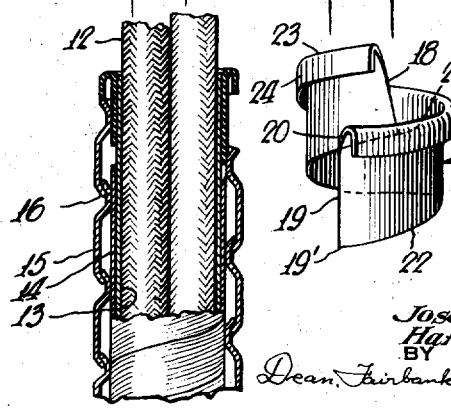
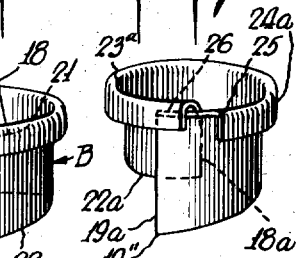
INVENTOR
Joseph Wertzheiser
Harry Charmoy
BY
Dean, Fairbank, Hirsch & Foster
ATTORNEYS Patented Oct. 29, 1935

2,018,939

UNITED STATES PATENT OFFICE 2,018,939

ARMORED ELECTRICAL CABLE

Joseph Wertzheiser, Newark, N. J., and Harry Charmoy, Long Island City, N. Y., assignors to Hillside Cable Co., Hillside, N. J., a corporation of New Jersey Application May 15, 1935, Serial No. 21,524

9 Claims. (Cl. 247—43)

Our present invention is concerned with armored electric conductors or cables of the familiar type commonly used in the electric wiring of building constructions.

Among the objects of the invention are to provide an armored cable of the above type, which may be expeditiously produced by automatic machinery, and which is substantially proof against electrical failure as for instance, due to tearing loose during installation of any insulation on the conductors that might have adhered to the armor sheath.

Another object is to provide an armored cable of the above type, with adequate protection along the entire exposed severed sharp edge of the sheath, and readily applied in installation of the cable, to preclude any possibility of cutting the insulation of the protruding outwardly turned conductors.

Another feature is the use of a split insulating bushing, to cover the exposed sharp cut edge of the sheath, said bushing having an advanced edge that is, a leading corner protruding longitudinally in advance of the rest of the bushing to facilitate anchorage between the metal sheath and the bonded protective cover, and fitting preferably in the space left by removal of corresponding length of the outer unbonded insulating layer, the bushing being of peripheral length somewhat greater than the inner periphery of the sheath for overlapping at the split edges. In one embodiment, the insulating bushing is of generally helical form, the split ends being longitudinally displaced, so that after insertion of the anchoring end, the exposed helical rim may be depressed into a common plane, with the split edges wedged into overlapping relationship and the bushing thus frictionally held in place. In another embodiment, the insulating bushing is cylindrically wound and is of peripheral length greater than one complete convolution, the inner or advance rim at one of the split edges having a guiding projection to facilitate anchorage at said edge, the outer or exposed rim of the bushing having its overlapped ends interlocked.

In the present application, the protective bushing is claimed per se and in its novel correlation with a conventional armored electric conductor. The novel features of the armored conductor herein disclosed, and the correlation therewith of a protective bushing are made the subject-matter of a divisional application, Serial No. 43,530 filed October 4, 1935.

In the accompanying drawing, in which is shown one or more of the various possible embodiments of the several features of the invention, Fig. 1 is a perspective view of a length of the armored cable, with the protective bushing inserted, Fig. 2 is a perspective view partly in longitudinal section, showing the removal of a portion of the outer protective layer, Fig. 3 is a view similar to Fig. 2 showing one step in the application of the protective bushing, Fig. 4 is a view similar to Fig. 3, showing the final step in the application of the bushing, Fig. 5 is a view in longitudinal cross-section showing the bushing applied, Fig. 6 is a perspective view of the bushing as an article of manufacture, and Fig. 7 is a view similar to Fig. 6 of an alternative embodiment of bushing.

Referring now to the drawing, there is shown an armored cable illustratively with two conductors 10 and 11, each covered by conventional insulation, illustratively braided covering 12. The conductors are shown enclosed in an insulating protective covering, which is preferably a continuous spirally wound sheet of paper 13 impregnated with wax, preferably paraffin. The width of the paper is illustratively three times the pitch at which it is wound, so that the completed sheath will be three-ply. In the conventional process of fabricating the armored cable by winding the protective covering simultaneously with the armor sheath, the paraffin or other wax becomes sufficiently softened to afford an adequate bond of the various convolutions and to effect a secure continuous insulating enclosure sheath, and this without the need for special application of any form of adhesive.

In addition to the bonded protective sheath, there is preferably employed, according to the present invention, the further outer insulating covering 14 of paper, devoid of wax or other adhesive, which is wound about the inner protective sheath 13. About the parts thus far described, is wound the conventional metal sheath 15 comprising a strip of metal wound on a pitch substantially equal to its effective width, the overlapping helical edges being crimped together at 16.

In the armored cable made as described, the outer paper layer 14 is free from any adhesive bond with respect to the sheath and substantially free of such bond with respect to the inner protective covering 13. Accordingly, no adhesive connection between the conductor or its protective covering and the outer metal sheath can occur, so that in bending and manipulating the latter, there is no possibility of tearing loose any of the protective insulation, and electric failures from this cause are not apt to occur.

The protective bushing for the armor end 17 severed or cut in the installation of the cable, is preferably of fibre and may be of helical rather than cylindrical conformation and of peripheral length somewhat greater than one complete convolution. As best shown in Fig. 6, the split ends 18 and 19 of the fiber bushing B are displaced longitudinally of the bushing along a pitch such that the trailing end 20 of the leading edge 19 overlaps the leading end 21 of the trailing edge 18. The leading end 19' of the leading edge 19 constitutes a guiding conformation for ready installation of the bushing and the part of the bushing adjacent said leading edge 19 becomes wedged or anchored in place in the application of the bushing, as best shown in Figs. 3 and 4. The leading rim 22 of the bushing is preferably of pitch somewhat greater than that of the outer or trailing rim 23 as appears from the fact that the leading split edge 19 is longer than the trailing split edge 18. Preferably, the pitch of the leading rim 22 of the bushing is substantially equal to that of the helically wound sheath, and the trailing rim 23 which has an outwardly turned flange 24 is of somewhat lesser pitch.

In use of the device, after cutting or severing the sheath as at 17 adjacent the outlet box or other terminal structure, the outer insulating layer 14 only is preferably removed down to a point slightly below the exposed end of the sheath, thereby to afford clearance. The exposed insulation covered conductors are now readily caused to enter the split 18, 19 of the bushing which is then pushed along the protective sheath 13 to become anchored adjacent leading edge 19, as best shown in Fig. 3, preferably under the advanced end of the severed or cut edge 17. The bushing thus becomes securely wedged or anchored near its split edge 19 between the sheath 15 and the contiguous protective covering 13 of the conductors. Thereupon, by pressing downward on the exposed rim 23 of the bushing, said rim is caused to move generally at right angles to its oblique length so that it becomes both longitudinally and circumferentially wedged in place between the anchored edge 19' of the bushing and the enclosed conductors. Thus, as best shown in Fig. 4, the exposed helical rim 23 becomes depressed into substantially a circular rim, with the split ends 18 and 19 of the bushing in overlapped relation.

The application of the bushing is quite expeditious, since it requires nothing more than the single manipulation of introducing the leading or anchoring end 19' with the thumb and then following with light pressure with the index and middle finger on the trailing rim 23 to wedge it home.

The bushing thus securely wedged in place is effective around the entire periphery of the sharp severed edge of the armor sheath, so that the construction avoids the objection to ordinary split insulating bushings, in which protection is substantially lacking at the region of the split. In the present construction, the split region is in fact of enhanced security, since a double layer of fiber is presented thereat.

While the particular form of bushing shown in Fig. 6 is desirable, it will be apparent that the anchoring conformation or entering longitudinal bushing edge might be used without extending the helical rim for the entire periphery of the bushing and that the helical rim of the trailing or outer edge might be dispensed with. Such constructions are embraced within the scope of certain of the broader claims herein.

A particular embodiment of such construction appears in Fig. 7, in which the bushing is cylindrically rather than helically wound, with the split ends 18a and 19a in overlapping relation, the periphery of the trailing or exposed flange rim 23a of the bushing lying in a common plane even prior to installation, and the leading rim 22a is circular for the major portion of its length, but presents an inclined extension or guiding tooth 19'' corresponding to the conformation 19' in Fig. 6. The flange 24a of this embodiment preferably terminates at 25, leaving an unflanged end adjacent edge 19, which end is straddled by the extremity of the flange 24a, as shown at 26. In the embodiment of Fig. 7, the bushing inherently remains in cylindrical conformation, and since the flange 24 straddles the trailing end of edge 19, the construction is interlocked.

It will thus be seen that there is herein described apparatus in which the several features of this invention are embodied, which in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having thus described our invention, what we claim as new and desire to secure by Letters Patent, is:

1. An armored electric conductor comprising an insulated wire, a protective covering of insulating material surrounding the wire, a metallic sheath enclosing the protective covering, and an insulating split bushing having a leading corner protruding longitudinally in advance of the rest of the bushing at one edge of the split to facilitate introduction and anchorage of said edge against the inner wall of the metallic sheath, the edges of the said split bushing being in overlapped relation to facilitate wedging the other edge between the anchored edge and the protective covering, with the bushing completely encircling the contents of the armored sheath.

2. An electric conductor comprising an insulated wire core, a helically wound armored sheath about said core, an insulated split bushing having a substantially helical edge presenting a leading corner protruding longitudinally in advance of the rest of the bushing at one edge of the split to facilitate pushing inward and anchoring of said edge at the cut end of said metallic sheath, the exposed rim of the bushing being frictionally held in the sheath with the other edge substantially to overlap the exposed end of the anchored edge of the bushing.

3. An armored electric conductor comprising one or more insulated wires, an armor sheath thereabout presenting an inner helical ridge, an insulating split bushing for protecting a cut end of said armor, the split edges of said bushing being displaced longitudinally thereof, thereby affording a helical inner rim and a helical outer rim, the inner rim affording a leading corner protruding longitudinally in advance of the rest of the bushing for ready guiding and anchoring the bushing at the corresponding split edge against the inner wall of the sheath, the protruding outer rim in home position being brought substantially into a circular plane, with the split ends of the bushing frictionally held in substantially overlapping relation within the sheath.

4. A protective insulating split bushing for an armored electric conductor, said bushing presenting a helically wound sheet of length slightly greater than a single convolution, and of pitch such that the outer rim of the leading end overlaps the inner rim of the trailing end, the inner rim of the leading end constituting a corner protruding longitudinally in advance of the rest of the bushing and serving to guide the bushing for anchorage adjacent the leading split edge.

5. A protective insulating split bushing for an armored electric conductor, said bushing presenting a helically wound sheet of length slightly greater than a single convolution, and of pitch such that the outer edge of the leading end overlaps the inner edge of the trailing end, the leading end affording a leading corner protruding longitudinally in advance of the rest of the bushing and serving for anchoring purposes, the outer or trailing rim having a reversely bent flange.

6. A protective split bushing for an armored electric conductor of peripheral length greater than a complete convolution, said bushing at one of the split edges having a leading corner protruding longitudinally in advance of the rest of the bushing and serving as an entering guide for anchorage of the corresponding split edge, said split edge overlapping part of the other split edge.

7. An armored electric conductor comprising an insulated wire, a protective covering of insulating materials surrounding the insulated wire, a metallic sheath enclosing the protective covering and an insulating split bushing anchored at one split edge against the inner wall of the metallic sheath, said bushing having an outturned flange at its outer rim, and of length slightly greater than the inner periphery of the armor it is to protect and having the unflanged outer extremity near one lateral edge straddled by the end of the flange at the other edge.

8. The combination as claimed in claim 7 in which one of the split edges has an advanced corner of substantially the pitch of the spirally wound armor and the unflanged outer extremity is at the same edge as said anchored corner.

9. A protective insulating split bushing for an armored electric conductor, said bushing presenting a cylindrically wound sheet of length greater than a single convolution, one of the split edges of said bushing being longer than the other and affording an extension tooth thereat for anchoring, the outer rim of the bushing having an outturned flange terminating short of said lengthened edge and straddled by that end of the flange at the opposite edge.

JOSEPH WERTZHEISER.
HARRY CHARMOY.